United States Patent [19]

Urich

[11] Patent Number: 4,974,112
[45] Date of Patent: Nov. 27, 1990

[54] APPARATUS FOR IMPROVED PROTECTION AGAINST LOWER MAGNITUDE FAULTS IN AN ELECTRICAL POWER DISTRIBUTION SYSTEM

[76] Inventor: Gary S. Urich, 600 Joyce St., Searcy, Ark. 72143

[21] Appl. No.: 350,320

[22] Filed: May 10, 1989

Related U.S. Application Data

[63] Continuation-in-part of Ser. No. 129,227, Dec. 7, 1987, abandoned.

[51] Int. Cl.$^5$ .............................................. H02H 3/24
[52] U.S. Cl. ......................................... 361/71; 361/72
[58] Field of Search ................................. 361/71–75

[56] References Cited

U.S. PATENT DOCUMENTS 2,861,223  11/1958  Seller et al. ............................ 361/72

OTHER PUBLICATIONS

*Type RC Automatic Reclosing Relay Instructions* Westinghouse Electric Corp. 12 pp. 4/54.
*Reclosing Relay Type NLR11A Instructions*, General Electric Co., 26 pp., 2/69.
*Agastat 7000 Series Timing Relay Data Sheets*, Amerace Corp., Union, N.J. 2 pp. 4/85.

*Primary Examiner*—Todd E. Deboer
*Attorney, Agent, or Firm*—James S. Pristelski

[57] ABSTRACT

Apparatus for improving the performance of conventional electromagnetic reclosing relays under continuous lower magnitude ground or phase faults in electrical power distribution systems. An incomplete sequence relay is connected to the reclosing relay to render the timing drum or cam of the reclosing relay operative when the contacts of the circuit breaker are open, and to reset the reclosing relay after a selected time interval when the breaker is closed. This arrangement prevents timing problems associated with lower magnitude faults which otherwise keep the reclosing relay from reaching its lockout condition.

4 Claims, 2 Drawing Sheets

APPARATUS FOR IMPROVED PROTECTION AGAINST LOWER MAGNITUDE FAULTS IN AN ELECTRICAL POWER DISTRIBUTION SYSTEM

This application is a continuation-in-part of application Ser. No. 07/129,227, filed on Dec. 7, 1987 now abandoned.

FIELD OF THE INVENTION

This invention relates generally to improved fault protection for electrical power distribution systems at lower magnitude faults. More particularly, it relates to an incomplete sequence relay connected to an electromechanical reclosing relay to permit the reclosing relay to be operative when the breaker contacts are open so that the reclosing relay will reach its lockout condition under lower magnitude permanent faults. If the fault is removed before the reclosing relay reaches its lockout condition, the reclosing relay will reset after a selected time delay while the breaker contacts are closed, thus preventing premature reset.

BACKGROUND OF THE INVENTION

Modern electrical power distribution systems typically employ various types of apparatus for protection and automatic sensing of abnormal or undesired conditions in the system. Automatic reclosing relays are frequently used for automatic reclosure of AC circuit breakers after such breakers are opened because of overcurrent or due to other protective action. Such relays are adjustable or settable to typically provide a few reclosures at predetermined time intervals, so that in the event that the breaker does not remain closed after the first reclosure, additional reclosures will be made. The first reclosure is usually "instantaneous" (reclosure of the breaker with no intentional time delay). The first reclosure is often successful because many of the faults encountered in the systems are of a temporary nature, such as lightning flashovers and faults caused by tree limbs or birds.

If the preset number of breaker reclosures is unsuccessful, the timing drum or cam of the reclosing relay runs to its "lockout" position. Any further attempts of breaker reclosure must then be made by manual operation.

However, such apparatus is not generally reliable for handling continuous lower current ground fault conditions in the power distribution system. To demonstrate this problem, a typical breaker with protective relays could consist of a ground fault relay, such as a Type IAC53 time overcurrent relay, and a reclosing relay, such as a Type NLR11, both manufactured by General Electric Company of Philadelphia, Pa. The ground fault relay could be set for a time dial setting of 6 and a tap setting and current transformer setting to give a 150 ampere minimum pickup. The reclosing relay could have three reclosings set at instantaneous, 20 seconds, 40 seconds; and reset set at next close.

When a line or conductor of the distribution system breaks due to storms, accident or other occurrence, and falls to the ground, there may be a continuous fault current in the general range of 150 to 180 amperes. Under such conditions, the line to ground impedance is not usually zero, but about 40 ohms may be typical. Ideally, the ground fault should be immediately detected by the ground fault relay which in turn will open the circuit breaker in a time of about 90 seconds. The reclosing relay in sequence with the ground fault relay should operate through its preset reclosing intervals and cycle around to its lockout position leaving the circuit breaker in a locked open position. However, with the above stated relay settings and conditions with a 150 ampere continuous fault, the circuit breaker will not be taken to a locked open position. Due to incompatible time sequencing between the ground fault relay and the reclosing relay, the reclosing relay will continue to reset and never go to lock out. The breaker in return will continue to open and close never going to a locked open position. This will be better understood from further timing considerations that follow.

SUMMARY OF THE INVENTION

The present invention provides improved ground fault and phase protection in electrical power distribution systems utilizing automatic electromechanical reclosing relays to automatically close the electrical contacts of circuit breakers. Such reclosing relays typically have a timing drum or cam that provides the selected timing sequence. The present invention utilizes an incomplete sequence relay in conjunction with the reclosing relay to permit the reclosing relay drum or cam to run to the next reclose step or to lockout (the final step) when the breaker contacts are open, and to run to reset when the breaker contacts are closed after a selected time delay if the reclosing relay drum or cam has begun to run (or step) but has not yet reached its lockout condition. Timing problems encountered at lower magnitude ground faults and phase faults are thereby prevented.

It is an object of the present invention to provide an economical, simplified and effective means of improving the performance of electromechanical reclosing relays in electrical power distribution systems under lower magnitude ground faults or phase faults, without requiring replacement or complicated reworking in order to obtain improved performance.

It is another object of the present invention to permit the timing drum or cam of an electromechanical reclosing relay to run to the next reclose or to lockout (the final step) when the breaker contacts are open, and to run to reset when the breaker contacts are closed after a selected time delay if the reclosing relay drum or cam has begun to run (or steps), but has not reached its lockout condition, in order to avoid timing problems at lower magnitude faults.

BRIEF DESCRIPTION OF THE DRAWINGS

The preferred embodiment of the present invention will now be described in conjunction with the accompanying drawings in which.

DETAILED DESCRIPTION OF THE PREFERRED EMBODIMENT

Figure 1:
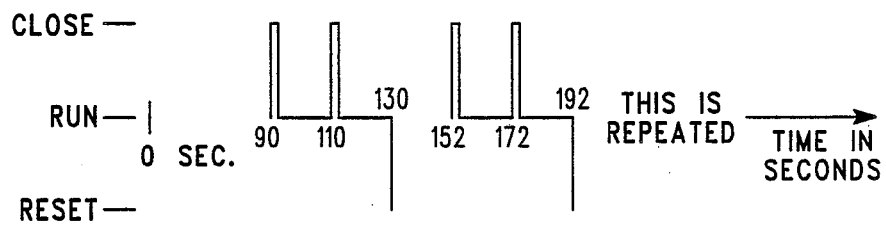
FIG. 1 is a timing diagram which aids in illustrating why a conventional electromagnetic reclosing relay under certain typical conditions and normal settings, without the present invention, will not go to the lockout condition under the presence of a continuous lower magnitude ground or phase fault.

In order to better understand and appreciate the present invention, the operation of a conventional electromechanical reclosing relay, under the presence of a continuous lower magnitude ground or phase fault, will first be considered in conjunction with the timing diagram of FIG. 1.

Conventional electromagnetic reclosing relays have been marketed for, and used in, electrical power distribution systems for quite a number of years. As such, reclosing relays are well known to those skilled in the art and do not need any general background discussion. One such reclosing relay is Type NLR11 commercially available from the General Electric Company of Philadelphia, Pa. This relay begins operating when the circuit breaker contacts are opened. It runs to (1) reclose the breaker, or (2) reset itself if breaker is closed after a preset time, or (3) lockout if breaker continues to open due to fault. The relay has selectable reclosings. For our example three typical reclosings of (first) instantaneous, (second) 20 seconds and (third) 40 seconds are selected. Also assuming a typical reset of next close, which means that when the relay timing drum or cam rotates to the next closing position, it will close the breaker if it is open or reset the reclosing relay if the breaker is closed.

Also in our example in reference to FIG. 1 a ground fault relay Type IAC53, time overcurrent relay, manufactured by General Electric Company of Philadelphia, Pa. with a time dial setting of 6 and a tap setting and current transformer setting to give a 150 ampere minimum pickup, is used to open the breaker.

With reference to FIG. 1, assume that a continuous ground fault of 150 amperes, the minimum fault range that is being protected, occurs at time zero. The ground trip relay begins to wind up and becomes completely wound up at 90 seconds. At this point in time, it opens the breaker. When the breaker opens, the timing drum of the reclosing relay begins to run. Since the reclosing relay is set to reclose instantaneously (assume that actual reclosure takes one second), the breaker is closed back onto the 150 ampere fault. The ground trip relay had one second to unwind. Total unwind time is 34.6 seconds with no load at a time delay setting of six. One second is 2.9 percent of 34.6 seconds. Thus, the ground trip relay unwound 2.9 percent and will require 2.9 percent of the total rewind time to again trip or open the breaker. Thus, the ground trip relay will be completely rewound again in 2.9 percent of 90 seconds=2.6 seconds. At this point, 90+1+2.6=93.6 seconds of total elapsed time, the ground trip relay again opens the breaker.

Since the first and "instantaneous" closing was unsuccessful, the reclosing relay again closes the breaker for the second time at 20 seconds after the first breaker opening at 90 seconds, 90+20=110 seconds of total elapsed time. The ground trip relay had 110−93.6=16.4 seconds to unwind; which is 47 percent of the total unwind time of 34.6 seconds. Since the 150 ampere fault is still present, it will take 47 percent of 90 seconds=42 seconds to again open the breaker; i.e. 110+42=152 seconds to the next opening.

However, the reclosing relay timing drum or cam has been running continuously since the first opening of the breaker, and at 90+40=130 seconds of elapsed time, it reaches reset since the breaker is closed despite fact that the 150 ampere fault is still on the line. The reclosing relay will repeat the above sequence again and again, with the reclosing relay being unable to reach the lockout condition, which is needed and should occur in view of the continuous fault.

In accordance with one aspect of the present invention, an incomplete sequence relay is connected to the reclosing relay in such a way that the timing drum or cam of the reclosing relay runs to next closed step, and finally to lockout when the breaker contacts are repeatedly opened by a protective relay which senses a sustainer fault regardless of whether it is a low or high magnitude fault. Thus, premature reset is avoided and the lockout condition is achieved on a sustainer fault. In accordance with another aspect of the present invention, where a fault is not sustainer after any opening and reclosing before the reclosing relay reaches its lockout position, the incomplete sequence relay causes the reclosing relay cam or drum to run to its reset position after a selected time. The reclosing relay is then ready to provide the full number of reclosings and lockout to any new fault that may be sensed by the protective relays.

Figure 2:
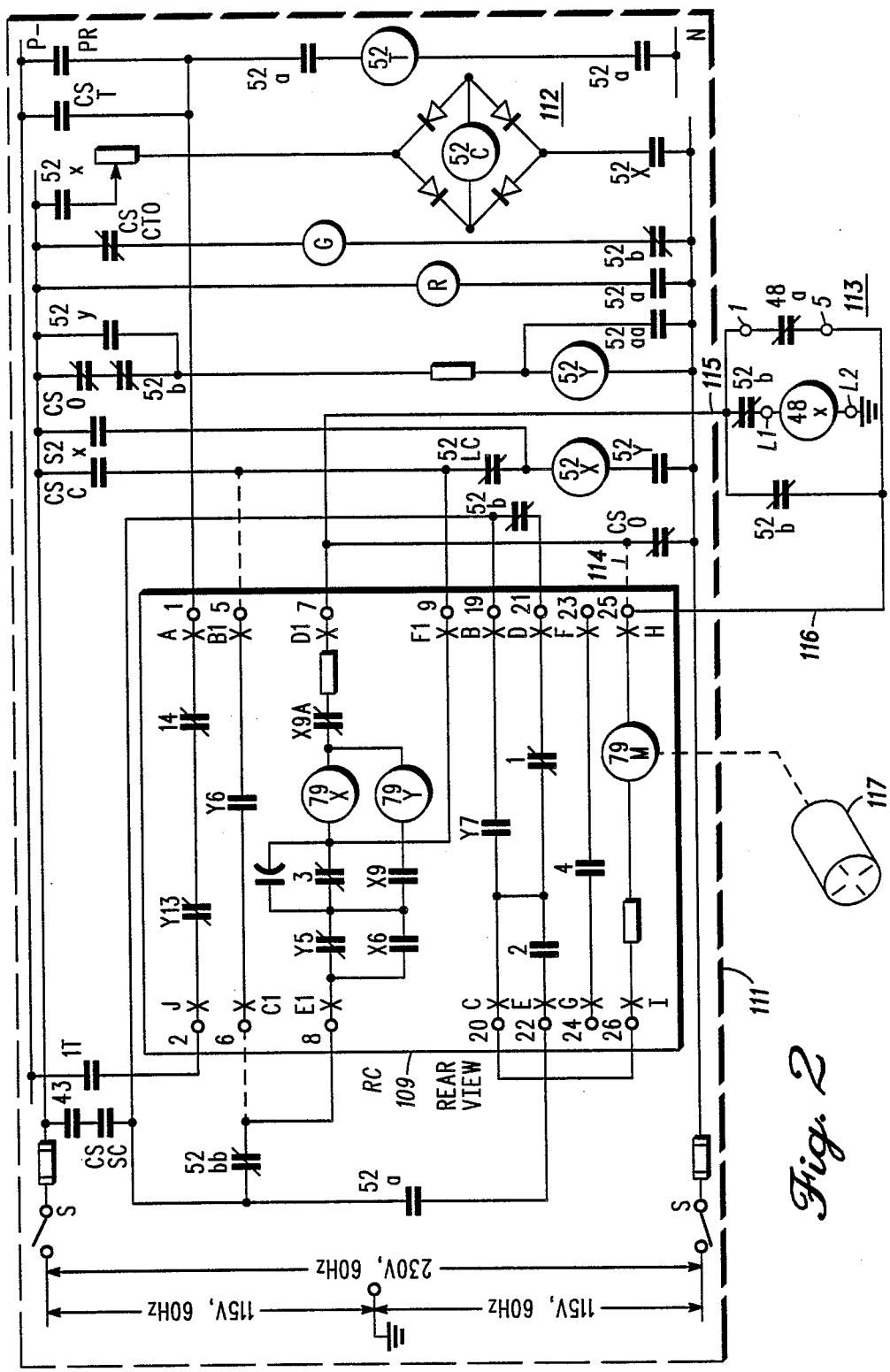
FIG. 2 is a schematic diagram illustrating the connection of an incomplete sequence relay to a reclosing relay in accordance with the present invention.

FIG. 2 illustrates the preferred embodiment of the present invention. The circuitry within the solid lines 109 is that of a Type RC reclosing relay commercially available from the Westinghouse Electric Corporation of Newark, N.J. The circuitry within the dashed lines 111 is that of a typical A.C. breaker control circuit. An incomplete sequence relay generally designated 113, is commercially available from the Amerace Corporation, Union, N.J. 07083, under the Agastat brand, as model number 7022. The procedure for adding the incomplete sequence relay 113 is as follows. A hardwired line 114 from external terminal 25 of reclosing relay 109 is cut or otherwise removed to open circuit terminal 25 from normally closed control switch contact CSO and external terminal 7. However, terminal 7 remains connected to contact CSO. A new line 115 is connected from terminal 7 of reclosing relay 109 to a pair of normally closed contacts 52b of the circuit breaker auxiliary switch. Contacts 52b are spare contacts in the breaker 111. These contacts are closed when the breaker is open. Line 115 is also connected to a normally closed contact 48a at terminal 1 of the incomplete sequence relay 113. Contact 48a delays in closing when the circuit breaker is closed and the incomplete sequence relay is deenergized.

The other terminal number 5 of contact 48a and one of the contacts 52b are connected via line 116 to terminal 25 of reclosing relay 109. The other terminal of the other contact 52b is connected to the coil 48x of incomplete sequence relay 113 at terminal L1, and the other terminal L2 of coil 48x is connected to ground.

Note that terminal 25 of reclosing relay 109 is connected to a driving means in the form of a motor or stepping relay 79M which causes a reclosing relay timing drum or cam 117 to rotate through its timing cycle. Thus, motor or stepping relay 79M and its associated timing drum or cam 117 is operative when the circuit breaker contacts are open through contact 52b, or when the breaker contacts are closed through the incomplete sequence relay contact 48a (which is time delayed or closes according to a selected time). The reclosing relay 109 thus has two sources of power 52b and 48a to its terminal 25. Contact 52b is the source of power that drives timing drum or cam 117 of the reclosing relay to the next reclose or finally to its lockout position. Contact 48a is the source of power that drives the reclosing relay to its reset position after a selected time interval. This selected time interval assures that all faults, even a low magnitude fault, are no longer present. By the use of these two sources of power to reclosing relay terminal 25, premature reset and failure to reach lockout, as occurred in the above discussion of the timing diagram in FIG. 1, is avoided.

The present invention can, of course, be applied to other models of electromechanical reclosing relays. In general, existing electromechanical relays can be modified under the present invention to improve the performance thereof at modest cost. New electromechanical relays can also be modified under the present invention at the time of installation. For many electrical distribution systems, either approach may be more cost effective than purchasing more expensive and sophisticated reclosing relays, such as some of the now available solid state relays.

While a preferred embodiment of my invention is described above, it will be obvious to those skilled in the art that numerous changes and modifications may be made thereto without departing from the true spirit and scope of the invention.

What I claim as new and desire to secure by Letters Patent of the United States is:

1. Apparatus for protecting against lower magnitude faults in an existing electrical power distribution system, said electrical power distribution system including:
   breaker means including a breaker for opening and closing at least one line of the electrical power distribution system.
   current sensing means for sensing a fault condition in said at least one line of the electrical power distribution system and for responding to the fault condition by causing said breaker to open at least one line of the electrical power distribution system, and
   reclosing relay means operatively associated with said breaker means to periodically reclose said breaker at predetermined time intervals after the breaker opens,
   the improvement comprising incomplete sequence relay means connected to the reclosing relay means to render said reclosing relay means operative when said breaker is open, and to reset the reclosing relay means after a selected time interval when the breaker is closed, whereby premature reset of the reclosing relay means is avoided by preventing the reclosing relay means from reaching its reset condition under said lower magnitude fault.

2. The apparatus as in claim 1 wherein said relay reclosing means includes a driving means to drive a timing cam through a timing cycle to generate the predetermined time intervals, and the incomplete sequence relay means renders the driving means of the reclosing relay means operative when said breaker is open, and to reset the reclosing relay means after a selected time interval when the breaker is closed.

3. A reclosing relay for protecting against lower magnitude faults in an electrical power distribution system, the electrical distribution system including a circuit breaker for opening and closing at least one line of the electrical power distribution system, and at least one current sensor for sensing a fault condition in at least one line of the electrical power distribution system and for causing the breaker to open at least one line of the system in response to said fault condition, said reclosing relay comprising:
   reclosing relay means responsive to the fault condition to reclose the circuit breaker in the electrical power distribution system at predetermined time intervals after the breaker opens, and
   incomplete sequence relay means connected to the reclosing relay means to render the reclosing relay means operative when said breaker is open, and to reset the said reclosing relay means after a selected time interval when the breaker is closed, whereby premature reset of the reclosing relay means is avoided by preventing the reclosing relay means from reaching its reset condition under said lower magnitude fault.

4. The reclosing relay as in claim 3 wherein said reclosing relay means includes a driving means to drive a timing cam through a timing cycle to generate the predetermined time intervals, and the incomplete sequence relay means renders the driving means of the reclosing relay means operative when said breaker is open, and to reset the reclosing relay means after a selected time interval when the breaker is closed.

* * * * *